United States Patent

Badger et al.

Patent Number: 5,854,823
Date of Patent: Dec. 29, 1998

[54] SYSTEM AND METHOD FOR PROVIDING RESOURCES TO TEST PLATFORMS

[75] Inventors: Brian S. Badger, Dallas; Craig E. Newman, Wylie, both of Tex.

[73] Assignee: MCI Communications Corporation, Washington, D.C.

[21] Appl. No.: 721,407

[22] Filed: Sep. 29, 1996

[51] Int. Cl.$^6$ .............. H04M 1/24; H04M 3/08; H04M 3/22

[52] U.S. Cl. .............. 379/15; 379/9; 379/10; 370/244

[58] Field of Search .............. 379/9, 10, 11, 379/12, 13, 14, 15, 19, 22, 1, 8, 16–17, 26; 370/248, 249, 250, 251; 395/674, 672, 200.04, 200.12, 200.56, 200.59

[56] References Cited

U.S. PATENT DOCUMENTS

| | | | |
|---|---|---|---|
| 3,893,024 | 7/1975 | Reines et al. | 379/1 |
| 4,747,130 | 5/1988 | Jen-Lie Ho | 379/269 |
| 5,065,422 | 11/1991 | Ishikawa | 379/11 |
| 5,313,453 | 5/1994 | Uchida et al. | 370/13 |
| 5,347,270 | 9/1994 | Matsuda et al. | 379/10 |
| 5,392,328 | 2/1995 | Schmidt et al. | 379/16 |
| 5,416,825 | 5/1995 | Renger et al. | 379/29 |
| 5,475,732 | 12/1995 | Pester, III | 379/34 |
| 5,495,470 | 2/1996 | Tyburski et al. | 379/15 |
| 5,500,851 | 3/1996 | Kozaki et al. | 370/13 |
| 5,500,853 | 3/1996 | Engdahl et al. | 379/1 |
| 5,539,804 | 7/1996 | Hong et al. | 379/33 |
| 5,546,450 | 8/1996 | Suthard et al. | 379/207 |
| 5,592,530 | 1/1997 | Brockman et al. | 379/34 |
| 5,602,828 | 2/1997 | Engdahl et al. | 370/228 |
| 5,608,720 | 3/1997 | Biegel et al. | 370/249 |
| 5,633,909 | 5/1997 | Fitch | 379/15 |
| 5,654,901 | 8/1997 | Boman | 379/1 |
| 5,673,255 | 9/1997 | Dunn et al. | 379/14 |

OTHER PUBLICATIONS

International Search Report for PCT/US97/17148 mailed 10 Feb. 1998.

*Primary Examiner*—Curtis A Kuntz
*Assistant Examiner*—Rexford N. Barnie

[57] ABSTRACT

A test system for testing a plurality of switches. A test platform requests the resources required for performing a test. A central configuration queue manager determines whether the requested resources are available and allocates the resources to the test platform. After performing the test, the test platform relinquishes (or releases) the allocated resources. The resources may be shared by several test platform. An example of such a shared resource is an operator services trunk. The resources may be dedicated for each test platform also. An example of such a dedicated resource is a switch trunk connecting a switch to a digital cross-connect. The digital cross-connect uses the switch trunk to connect a test platform to the switch upon request from the test platform.

16 Claims, 2 Drawing Sheets

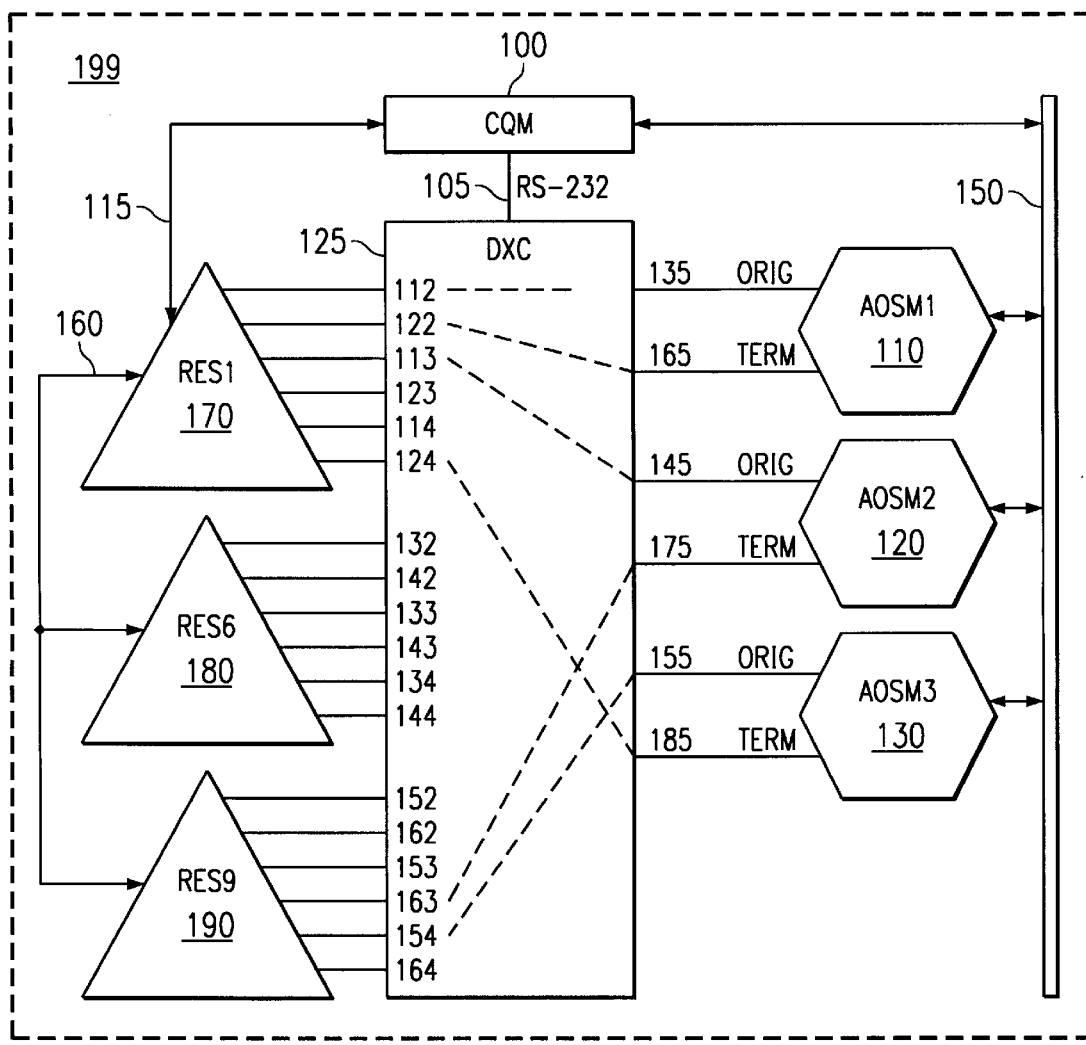
FIG. 1
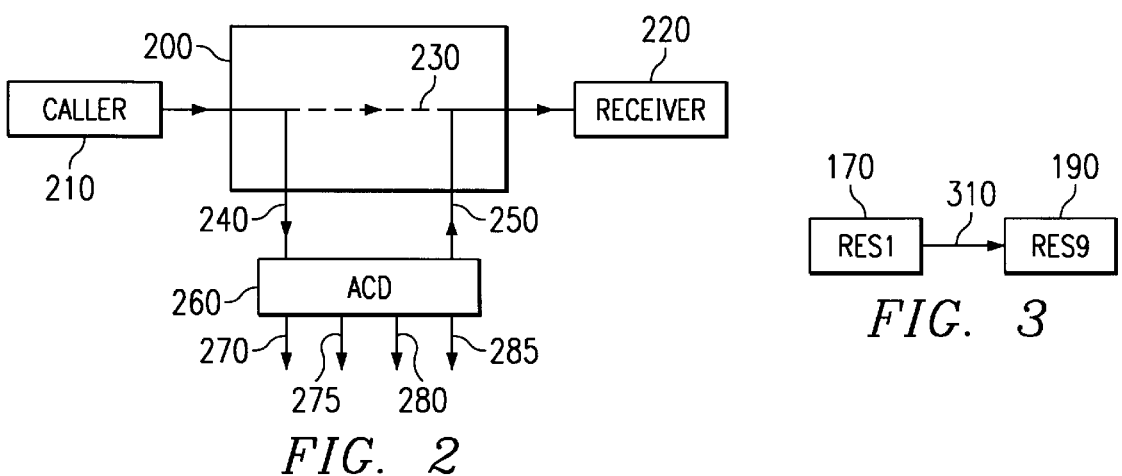
FIG. 2
FIG. 3

SYSTEM AND METHOD FOR PROVIDING RESOURCES TO TEST PLATFORMS

CROSS-REFERENCE TO RELATED APPLICATION

This application is related to a commonly owned application, filed on even date herewith, entitled "A System and Method for Providing Shared Resources to Test Platforms" and having Attorney Docket Number RIC-95-049, which is incorporated herein by reference.

BACKGROUND OF THE INVENTION

1. Field of the Invention

The present invention relates generally to the field of telecommunications, and more particularly to a system and method for providing resources to test platforms.

2. Related Art

Telecommunications equipment and services are often tested prior to being deployed into commercial environments. Commercial environments include network elements (e.g., switches) from various manufacturers. These network elements may further include varying revisions of software. A goal of the testing process prior to deployment is to identify and resolve any potential problems in the provision of network services. The problems may include, for example, compatibility problems between newly developed network elements and/or software.

An organization may employ several test platforms to perform several tests in parallel on several switches. Examples of such switches include an AXE switch from Ericsson, Inc., and a DEX switch from Digital Switch Corporation. Several resources may be required to perform a test. For example, test platforms may require connections to several switches to send commands corresponding to a test and to gather results of the test.

Generally, the provision of a dedicated connection from each test platform to each switch is often unmanageable due to the large number of connections. For example, connecting 10 test platforms to 5 switches would require 50 (i.e., 5×10) dedicated connections. In addition, a test platform may not be designed to be physically connected to several switches at the same time.

As an alternative to dedicated connections, a connection may be manually established from a test platform to a switch when the test platform needs to perform a test on the switch. These manual methods of establishing a connection may take a long period of time. Such long periods are often unacceptable to an efficient test environment.

Therefore, what is needed is a system which enables a test platform to be connected to a desired switch in a short duration so that a test may be carried out without undue delays.

Also, tests run from different test platforms may need access to a same type of resource, e.g., a specific type of trunk on a switch. It may not be cost-effective to provide a dedicate resource of such a type to each test platform. Therefore several test platforms may need to share a resource for cost-effectiveness.

However, for a testing environment with shared resources to operate effectively, the shared resources need to be allocated efficiently. Generally, what is needed in an integrated test environment is a system and method of efficiently providing the resources required for performing tests.

SUMMARY OF THE INVENTION

The present invention is directed to a system and method in which the allocation of resources required for a test is coordinated from a central manager. A test platform sends a command requesting a resource (e.g., a connection to one of the switches or a trunk) required for performing a test. A manager receives the command and then allocates the resource to the test platform in response to receiving the command. The test platform performs the test after being allocated the resource.

The test system also includes a cross-connect coupled to the test platform by a test trunk and to a switch by a switch trunk. The cross-connect provides a connection between the test platform and the switch by connecting the test trunk to the switch trunk. Thus, one of the resources managed by the manager is the connection between test trunks and the switch trunks. The manager sends a connect command to the cross-connect to cause the cross-connect to provide the requested connection.

Each switch includes a switch trunk dedicated for connection to a corresponding test trunk connected to a test platform. The cross-connect connects the switch trunk to the test trunk to provide the requested connection.

Other resources in the test system which are allocated by the manager include an operator services trunk on a non-bridging switch. A test typically requires that the operator services trunk point to a desired bridging switch. The desired bridging switch processes the operator service calls.

The manager of the present invention determines whether the operator services trunk is pointing to the bridging switch specified in a command. If the operator services trunk is pointing to the desired bridging switch, the manager indicates that the operator services trunk is allocated to the test sending the command.

If the operator services trunk is pointing to a bridging switch other than the desired bridging switch, the manager places the command in a queue. The queue is operated on a first come first serve basis.

As the resources are allocated just before performance of a test and released upon completion of the test, the resources may be optimally utilized. Optimal utilization of resources may result in a decrease in overall time required for completing a set of tests. By using a first come first serve basis in managing queues for allocating shared resources, the implementation of queuing mechanism may be simplified.

BRIEF DESCRIPTION OF THE FIGURES

The above and further advantages of the present invention may be better understood by referring to the following description taken in conjunction with the accompanying drawings, in which:

FIG. 1 is a block diagram of a test system including several test platforms for testing a plurality of switches;

FIG. 2 is a block diagram illustrating an operator service call;

FIG. 3 is a block diagram showing a non-bridging switch pointing to a bridging switch to service an operator service call;

DETAILED DESCRIPTION OF THE PREFERRED EMBODIMENTS

Figure 4:
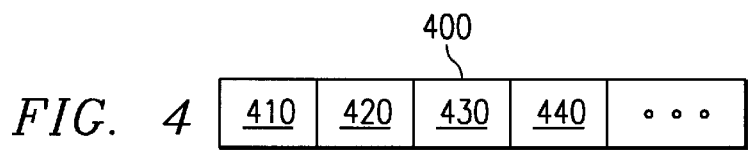
FIG. 4 is a diagram illustrating the information maintained by a configuration queue manager in allocating an operator services trunk to test platforms.

FIG. 1 is block diagram illustrating a test system 140 comprising three test platforms AOSM1 110, AOSM2 120 and AOSM3 130, configuration queue manager (CQM) 100, digital cross-connect (DXC) 125, network 160, Internet protocol (IP) network 150, and three switches RES1 170, RES6 180 and RES9 190. Each switch 170, 180 and 190 is shown connected to DXC 125 by three pairs of switch trunks (e.g., RES1 170 is connected to DXC 125 by switch trunks 112–114 and 122–124). Each test system 110, 120 and 130 is shown connected to DXC 125 by a pair of test trunks (135, 145, 155 and 165,175,185). CQM 100 is connected to DXC 125 by command bus 105, and to RES1 170 by communication path 115.

The system and method of allocating a resource of the present invention is described mostly with reference to AOSM1 110 and switch RES1 170. However, it should be understood that the description is applicable to other switches 120 and 130, and other test platforms 120 and 130. In a preferred embodiment of the present invention, a resource usually refers to one of the switch trunks 112–114, 122–124, 132–134, 142–144, 152–154 and 162–164 or an operator services trunk from RES1 170 in network 160. However, it will be apparent to one skilled in the relevant art that the present invention is applicable to other types of resources also.

To perform a test, AOSM1 110 determines all the resources required for performing a test and requests CQM 100 to allocate the resources. CQM 100 determines whether the requested resources are available, allocates the available resources to AOSM1 110, and sends a message to AOSM1 110 indicating that the resources are allocated. AOSM1 110 performs the test and then releases the allocated resources.

As the resources are allocated dynamically (i.e., just before a resource is needed) to a test and released upon completion of the test, the resources of the present invention are utilized optimally. Such an optimal utilization of the resources usually results in a decrease in the overall amount of time required to perform a set of tests. This reduction in time allows test system 140 to handle a greater volume of tests. The implementation and structure of each component of test system 140 and the resources required for a test are described in further detail below.

AOSM1 110 may comprise a conventional computer system programmed to generate command requests and to perform tests in accordance with the present invention. To perform a test, AOSM1 110 first determines the resources required for the test. The resources required may be indicated by a program implementing a test on AOSM1 110. AOSM1 110 then sends command requests to CQM 100 on IP network 150. Each command request indicates a resource required for the test. In a preferred embodiment, commands for all resources required for performing a test may be included in a single IP packet.

As noted above, the requested resources include connections to an originating switch and a terminating switch. An originating switch may be a first switch in a series of switches which provide a circuit connection to serve, for example, a telephone voice call. The circuit may span several intermediate trunks and intermediate switches. A termination switch may be the last switch which connects the call to a receiving party/device. However, in the test environment of the present invention, while testing any two switches in a circuit path, an earlier switch (i.e., closer to the first switch) in the circuit connection path may be treated as an originating switch and a later switch (i.e., farther from the first switch) in the circuit connection as a termination switch.

AOSM1 110 is shown connected to an originating test trunk 135 and a termination test trunk 165. For illustration purposes, AOSM1 110 is assumed to have requested RES1 170 as an originating switch and RES9 190 as a termination switch. To satisfy the requests, originating test trunk 135 is to be connected to one of originating switch trunks 411, 412 and 413 of RES1 170, and terminating test trunk 165 is to be connected to one of terminating test trunks 591, 592 and 593 of RES9 190. DXC 125 performs the required connections under the control of CQM 125 as will be explained later.

The resources required in a preferred embodiment may also include an 'operator service trunk'. An operator service trunk, as relevant to the present invention, is explained with reference to FIGS. 2 and 3. With reference to FIG. 2, switch 200 receives an operator service call (e.g., collect call) from a caller 210 and connects the call to automatic call distributor (ACD) 260 over line 240. ACD 260 may connect the call to one of the operators available to service the call over one of the lines 270, 275, 280 and 285. An operator receives the call, determines the telephone number of a receiving party (for example, by speaking to the caller), and dials the number over line 250. Once receiver 220 receives the call and agrees to accept the call, the operator establishes a connection between caller 210 and receiver 220. Caller 210 may then continue to communicate directly to receiver 220.

A bridging switch differs from a non-bridging switch in the manner in which the call stays connected during a period caller 210 communicates with receiver 220. If switch 200 is a bridging switch, switch 200 bridges the two connections 240 and 250 internally, and connects the calls directly without having ACD 260 in the middle of the connection. The bridging is shown as a dotted line 230 in FIG. 2. Once the call is bridged, the trunks (or channels in the trunks) corresponding to 240 and 250 are released from the bridged call, and are available to service subsequent operator service calls. Hence, trunks 240 and 250 of a bridging switch may not be tied for the entire duration of the operator assisted call, i.e., during a period when caller 210 talks to the receiver 220. Trunks 240 and 250 may be expensive and it is therefore desirable that operator service calls be bridged.

On the other hand, if switch 200 is a non-bridging switch, the call stays connected over trunks 240 and 250 during the entire duration of the operator service call. The call may not be bridged internally within switch 200. To avoid tying up trunks 240 and 250 during an operator service call, a non-bridging switch may point a trunk to a bridging switch as further illustrated in FIG. 3.

In FIG. 3, for the purpose of explanation, RE1 170 is assumed to be a 'non-bridging switch' such as a DEX-600E switch available from DSC Communications Corporation, and RES9 190 is assumed to be a 'bridging switch' such as a DMS-250 switch available from Nortel (Northern Telecom) Corporation. To handle operator service calls more efficiently, non-bridging switch RES1 170 may point an operator service trunk 412 to bridging switch RES9 190. Operator service trunk 412 may be included in network 160 of FIG. 1.

By pointing the operator service trunk 412 to RES9 190, RES1 170 forwards all operator services calls to RES9 190. As RES9 190 is a bridging switch, trunks such as 240 and 250 of FIG. 2 may not be tied-up during the entire duration of an operator service call. However, an operator services trunk may point to only one bridging switch. Therefore, if an operator services trunk is pointing to a switch other than a desired bridging switch, a test may need to wait until the operator services trunk becomes available to be pointed to the desired bridging switch. In the present invention, such an operator service trunk is treated as a resource which is allocated among different tests.

Referring back to FIG. 1, DXC 125 receives commands from CQM 100 and provides the specified connections between test platforms 110, 120, 130 and switches 170, 180, 190. DXC 125 may be one of several commercially available (e.g., available from DSC Communications Corporation) digital cross-connect switches. DXC 125 may be capable of connecting any test trunk to any switch trunk as specified by a connect command received from CQM 100.

Switches 170, 180, and 190 are connected by several service trunks shown together as network 160. The service trunks generally carry data traffic corresponding to, for example, telephone voice calls. The service trunks include operator services trunks from non-bridging switches. Each switch 170, 180 and 190 is connected to DXC 125 by several pairs of switch trunks. One of the two trunks in each pair is designated as an originating test trunk (112–114, 132–134, and 152–154), and the other a terminating test trunk (122–124, 142–144, and 162–164).

In a preferred embodiment, the number of pairs from each switch 170, 180, and 190 is equal to the number of test platforms. In FIG. 1 only three test platforms are shown, and accordingly each switch 170, 180 and 190 is shown with three pairs of switch trunks. Therefore, each pair of trunks is dedicated to a test platform. For example, switch trunk pair 461, 561 is dedicated for connection to AOSM1 110. Hence, CQM 100 causes originating test trunk 135 to be connected to originating switch trunk 461 if AOSM1 110 requests a connection originating from RES6 180. Similarly, CQM 100 causes terminating test 165 to be connected to terminating switch trunk 561 if AOSM1 110 requests a connection terminating to RES6 180.

By providing each of the switches 170, 180 and 190 with a number of pairs equal to the number of test platforms in test system 140, a preferred embodiment ensures that each platform receives a connection to a desired switch without any waiting (and consequent delays). However, an alternate embodiment may include a greater number of test platforms than the number of pairs of switch trunks from each switch. In such an embodiment, the switch trunks are dynamically allocated as will be explained in the following description.

CQM 100 receives an IP packet including requests for resources via IP network 150 and processes the requests. To process the requests, CQM 100 first determines whether all the required resources are available. If all the resources are available, CQM 100 allocates the requested resources. If a resource is not available, CQM 100 places the resource request in a queue corresponding to the resource until the resource becomes available for allocation to the command. After allocating all the resources, CQM 100 sends a message on IP network 150 to the test platform performing the test indicating that the resources have been allocated.

Further details of operation of CQM 100 in processing a command requesting a resource are now provided. As already explained, in a preferred embodiment the resources may include a connection from a test platform to a switch and an operator services trunk. The command includes data specifying whether the request is for a connection or for an operator services trunk. The command also includes data relevant to the type of request. For example, if the request is for a connection, the command specifies an origination trunk and a termination trunk. If the request is for an operator services trunk, the command specifies a bridging switch and a non-bridging switch. The manner in which CQM 100 processes commands for an operator services trunk is explained first, followed by the explanation of processing for commands for connections to the switches 170, 180, and 190.

As already explained with reference to FIGS. 2 and 3, each operator services trunk may point to only one bridging switch. To manage an operator services trunk as a resource to be allocated, CQM 100 maintains status data element 400, the logical structure of which is shown in FIG. 4. Status data element 400 may be stored in memory elements such as a random access memory or registers or secondary storage.

Field 410 of data element 400 indicates a bridging switch to which the operator service trunk is presently pointing. In a preferred embodiment, a predetermined value, such as NULL or 0, in field 410 indicates that no test platform is presently allocated the operator services trunk. Field 410 may be set to a Null-value, for example, when CQM 100 is initialized. Each of the fields 420, 430, and 440 stores a value indicative of a test platform to which the operator services trunk is presently allocated as will be further explained in the following description. Fields 420, 703, and 440 may store a value of NULL to indicate that the corresponding field does not store a valid test platform identifier.

It will however be appreciated that other techniques such as using a flag to indicate whether each field 420, 430 and 440 stores a valid test platform identifier may be used without departing from the scope and spirit of the present invention. If none of the fields 420, 430, and 440 store a valid test platform identifier, the operator service trunk is available for allocation. In an alternate embodiment, CQM 100 may include a counter which maintains a count of the number of test platforms which have been allocated the operator services trunk pointing to the bridging switch specified by field 410. In such a case, a counter value of zero indicates that no test is presently allocated the operator services trunk.

CQM 100 maintains a queue for each operator services trunk. When an operator service trunk is unavailable, the command requests received are queued in a corresponding operator services trunk queue. In a preferred embodiment, the command requests in the queue are serviced in a first-come-first-serve model well known in the art, i.e., when the operator service trunk become available, the trunk is allocated to the command which has been waiting the longest period in the queue. Such command is then deleted from the queue.

However, before placing a command in an operator service trunk queue, the command is examined to determine whether the request requires the operator services trunk to point to the same bridge as the operator trunk is presently pointing to as indicated by field 410. If the trunk is so pointing, CQM 100 of the present invention determines that the operator service trunk is available for the test sending the command.

CQM 100 allocates the resources to a test platform 110, 120, 130 if all the resources required for the test are available. The specific steps performed to allocate an operator services trunk depend on whether the operator services trunk was already pointing to the target bridging switch specified by the command request. The details of the steps are explained below.

If an operator services trunk is not pointing to the desired target bridging switch, CQM 100 logs on to the non-bridging switch from which the operator service trunk originates, and programs the corresponding non-bridging switch to cause the operator service trunk to point to the desired target bridging switch. For example, assume AOSM1 110 requests an operator services trunk originating in non-bridging switch RES1 170 to point to bridging switch RES9 190. Also assume that the operator services trunk was pointing to RES6 180, and is unavailable when the command from AOSM1 110 is received. The command is placed in a queue corresponding to the operator services trunk, and once operator service trunk become available, the command from AOSM1 110 is processed. To change the configuration of the operator services trunk to point to RES9 190, CQM 100 logs on to RES1 170 and sends commands to cause the operator services trunk to point to RES9 190. In a preferred embodiment, CQM 100 may use well-known protocols such TCP/IP (Transmission Control Protocol/Internet Protocol) to log on to RES1 170 and reconfigure the operator services trunk direction.

After configuring an operator services trunk from non-bridging switch (RES1 170) to point to bridging switch (RES9 190), CQM 100 changes field 410 to store a value indicative of the new bridging switch RES9 190. One of the fields 420, 430, and 440 is changed to indicate that the test system (AOSM1 110 in the above example) is allocated the bridging switch in the configuration corresponding to value in field 410.

However, if the operator services trunk is already pointing to the desired bridging switch, CQM 100 simply updates the fields 420, 430, and 440 in status data element 400 (or counter value in an alternate embodiment) to indicate that the test platform sending the command is also allocated the operator services trunk in the present status. Therefore, fields 420, 430, and 440 indicate whether the operator services trunk is concurrently allocated to more than one test platform 110, 120 and 130.

Once a test platform (e.g., AOSM1 110) completes performing a test which uses an operator services trunk, AOSM1 110 sends a command in a packet to release the operator service trunk. CQM 100 receives the command from the transaction queue and modifies status data 400 to indicate that the operator services trunk is not being used by AOSM1 110. Such modification may entail deleting an identifier for AOSM1 110 from the fields 420, 430, and 440. One embodiment of CQM 100 may also set field 410 to NULL if AOSM1 110 is the last test platform using the operator services trunk. In an alternate embodiment, the counter value may be decreased by 1 to indicate that one fewer number of test platforms are using the operator services trunk.

The manner in which CQM 100 processes the command requests in relation to establishing connections between test platforms 110, 120, 130 and switches 170, 180 and 190 is now explained. For illustration, AOSM1 110 is assumed to send a command requesting a connection to origination trunk of RES1 170 and a termination trunk of RES9 190. As switch 170 is provided with a pair of switch trunks for each of the test platforms 110, 120 and 130, the requested connections are always available in a preferred embodiment.

To allocate the connection, CQM 100 maintains one or more tables indicating which ports (of DXC 125) are coupled to which switch/test platform. To connect a test platform to a switch, CQM 100 determines which switch trunk port is to be connected to which test trunk port to provide the desired connection. Such a connection is provided by DXC 125 and shown as dotted lines in DXC 125. Therefore, CQM 100 first determines which port of CQM 100 is to be connected to which port, and then sends a connect command to DXC 125 or RS-232 line 105. As already explained, in a preferred embodiment the resources may include a connection from a test platform to a switch and an operator services trunk. The command includes data specifying whether the request is for a connection or for an operator services trunk. The command also includes data relevant to the type of request. For example, if the request is for a connection, the command specifies an origination trunk and a termination trunk. If the request is for an operator services trunk, the command specifies a bridging switch and a non-bridging switch. The processing of a request for an operator services trunk is explained first.

In the above example in which AOSM1 110 is assumed to send a command requesting a connection to origination trunk of RES1 170 and a termination trunk of RES9 190, a first connect command causes DXC 125 to connect AOSM1 110's origination trunk 135 to RES1 170 as shown by a dotted line. CQM 100 then sends another command to DXC 125 to cause test trunk 165 to be connected to switch trunk 591 (dotted line connection not shown). The specific format of connect commands sent is dependant on the implementation on the design of DXC 125. In the case of connecting the trunks, test platform 110 may not need to send subsequent commands to release the connections if the switch trunks are dedicated for connection to each test platform.

Figure 5:
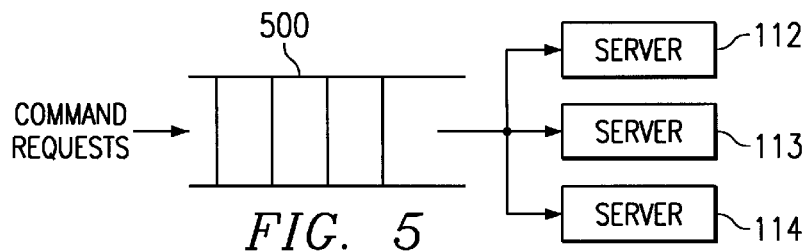
FIG. 5 illustrates a queue structure maintained by a configuration manager for allocating shared resources in accordance with the present invention.

In an alternate embodiment, test system 140 may include a greater number of test platforms than the number of pairs of switch trunks connected to each switch. In such a case, CQM 100 maintains a queue (shown as 500 in FIG. 5) to queue all requests to originating trunks of a switch, and another queue to queue all requests to terminating trunks of the switch. The trunks may be allocated in a first come first serve basis well known in the art. As each queue is processed by multiple testing trunks, a single queue multiple server model (also well known in the art) is employed. In this embodiment, each test platform 110, 120, 130 sends a command releasing a switch trunk once the test using the trunk is completed. Accordingly the released switch trunk is available to serve the next command (i.e., the command waiting for longest time) in queue 500, i.e., the test platform next in queue 500 is allocated the released switch trunk.

In either embodiment, once all the resources required for a test are available and allocated, CQM 100 sends a message on IP network 150 to the test platform performing the test. The message indicates that the requested resources have been allocated. In response, the test platform begins running the test. After the test is complete, the test platform releases any shared resources as explained above.

However, if any of the requested resources for a test is unavailable, a preferred embodiment of the present invention does not allocate any of the requested resources. CQM 100 places the command request (including a test platform identification) in a queue corresponding to the unavailable resource, and sends a message to the requesting test platform indicating which of the resources have been unavailable, and how many members are ahead in the corresponding queue. Once such an unavailable resource becomes available, CQM 100 allocates the resource to the test platform first in the queue, and indicates to the test platform that the resource is allocated to the test platform.

Figure 6:
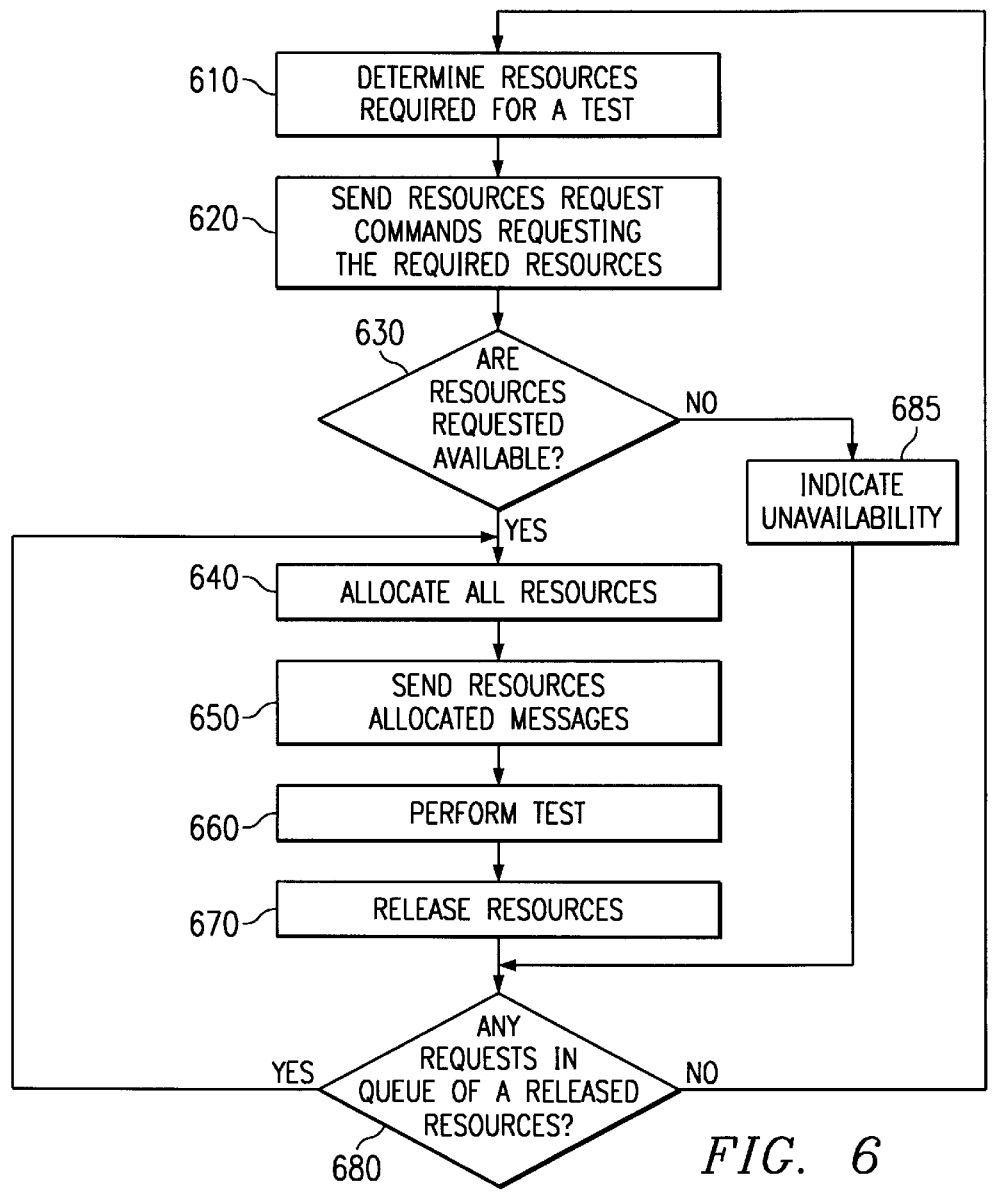
FIG. 6 is a flow-chart illustrating the steps performed by a test system in accordance with the present invention.

The operation of various components in test system 140 is summarized again with reference to the flow-chart of FIG. 6. For clarity, the flow-chart is explained with reference to AOSM1 110. The process begins in step 610, where AOSM1 110 determines the resources required for conducting a test. The resources generally include connections to an originating switch and a connection to a termination switch, and possibly an operator services trunk as explained above. However, it will be appreciated that other resources required for performing a test may also be included by one skilled in the art by using the description provided in the present application.

In step 620, AOSM1 110 sends a packet to CQM 100 requesting all the resources required for performing a test. In step 630, CQM 100 determines whether the required resources are available as explained above with reference to FIGS. 1, 4, and 5. If all the required resources are available, in step 640, CQM 100 allocates each required resource to AOSM1 110 as also explained above with reference to FIGS. 1, 4, and 5. Some of the resources (such as operator services trunk) may be concurrently shared by several test platforms, and others may not be shared concurrently. In step 640, CQM 100 sends a resources allocated message to AOSM1 110.

In response to a resource allocated message, AOSM1 110 performs a test in step 660, and sends a message to CQM 100 to release the allocated resources. In step 680, CQM 100 checks whether other test platforms 120 or 130 are waiting for the released resource. If any test platforms are waiting for the released resource, and if the released resource is the only resource the waiting test platform is waiting for, CQM 100 allocates the resources in step 640 for the waiting work platform.

If CQM 100 determines that a required resource is unavailable in step 630, CQM 100 sends a resource unavailability message to AOSM1 110 in step 685, and places AOSM1 110's request in a queue corresponding to the unavailable resource. CQM 100 waits for the resource to be available in step 680.

It will thus be appreciated that CQM 100 serves as a central station for dynamically allocating all the resources required by test platforms 110, 120, and 130 for performing a test. The resources may be shared (e.g., operator services trunk) or dedicated (connections between switches and test platforms in one embodiment). The present invention further provides additional connections (e.g., bus 115 of FIG. 1) for CQM 100 to perform any configuration changes to the resources (e.g., RES1 170 of FIG. 1).

As the resources are allocated just prior to the performance of a test and released upon completion of the test, the resources may be optimally utilized, thereby resulting in a decrease in overall time required for completing a set of tests. In addition, by using a first come first serve basis in allocating shared resources, the implementation of test system 140 may be simplified. By allocating a resource only if all resources required for a test are available, test system 140 may avoid deadlock problems known in the art. Also, as a test usually consumes only a few minutes in a preferred embodiment, a test may not need to wait for resources for an unduly long period of time.

It will be further appreciated that various modifications can be made to the embodiments described above by one skilled in the art by reading the description provided herein without departing from the scope and spirit of the present invention. For example, test system 140 may be modified such that a single computer system may allow performance of several tests in parallel. Each of such tests may be implemented to run in parallel by using, for example, a process for each test. In such a case, each test platform 110, 120, and 130 may refer to such a process running a test.

Thus, while various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

What is claimed is:

1. A test system comprising:
   a plurality of switches including a bridging switch and a non-bridging switch, wherein an operator services trunk originates from the non-bridging switch;
   a test platform for performing a test on said bridging switch and said non-bridging switch, said test platform being coupled to a pair of test trunks comprising a first test trunk and a second test trunk, said test platform sending a first command requesting a connection to each of said bridging switch and said non-bridging switch, and a second command requesting that said operator services trunk point to the bridging switch;
   a cross-connect coupled to said test platform by said pair of test trunks, said cross-connect also being connected to each of said plurality of switches by a switch trunk; and
   a manager coupled to said cross-connect and said test platform, said manager receiving said first command and said second command from said test platform, said manager sending a plurality of connect commands to said cross-connect to process said first command, said manager configuring said operator services trunk to point to said bridging switch to process said second command,
   wherein said cross-connect connects said switch trunk coupled to said bridging switching to said first test trunk, and said switch trunk coupled to said non-bridging switching to said second test trunk in response to said plurality of connect commands, and
   wherein said test platform performs said test after said manager completes processing said first command and said second command.

2. A test system for testing a plurality of switches, said test system comprising:
   a plurality of resources, said resources being required for performing a test on at least one of the plurality of switches;
   a test platform for performing said test, said test platform sending a command requesting said resources; and
   a manager for receiving said command,
   said manager determining the availability of each of said resources in response to receiving said command,
   said manager allocating all of said resources to said test platform if all of said resources are available for allocation,
   said manager allocating none of said resources to said test platform if one or more of said resources are unavailable for allocation,
   wherein said test platform performs said test after being allocated all of said resources.

3. The test system of claim 2 further comprises a cross-connect, wherein said cross-connect is coupled to said test platform by a test trunk and to one of said switches by a switch trunk, said cross-connect providing a connection between said test platform and said one said switches by connecting said test trunk to said switch trunk, and wherein said plurality of resources comprises said connection.

4. The test system of claim 3, wherein said manager sends a connect command to said cross-connect to cause said cross-connect to connect said test trunk to said switch trunk to provide said requested connection.

5. The test system of claim 4 further comprising:

a plurality of test platforms including said test platform; and a pair of switch trunks for each of said plurality of test platforms, wherein said pairs of switch trunks are coupled between said cross-connect and one of said plurality of switches, wherein said cross-connect couples said test trunk of said test platform to one of said pair of switch trunks as specified by said connect command.

6. The test system of claim 2, wherein one of said resources is an operator services trunk originating from a non-bridging switch and pointing to a bridging switch, wherein said non-bridging switch and said bridging switch are comprised in said plurality of switches.

7. The test system of claim 6 further comprising a means to enable said manager to automatically log on to said non-bridging switch to change configuration on said non-bridging switch to have said operator services trunk point to said bridging switch.

8. The test system of claim 7, wherein said manager receives a second command from an another test platform for said operator services trunk, and wherein said second command indicates a bridging switching to which said operator service trunk is to point to.

9. The test system of claim 8, wherein said manager determines whether said operator services trunk is pointing to said bridging switch specified in said second command, and wherein said manager indicates that one of said resources requested by said second command is allocated if said operator service trunk is pointing to said bridging switch.

10. The test system of claim 8 further comprising a cross-connect coupled to one of said switches by a switch trunk, wherein said cross-connect is designed to provide a connection from said one of said plurality of switches to either said test platform or to said another test platform by using said switching trunk, wherein said plurality of resources comprises said connection.

11. A method of testing a plurality of switches, the method comprising the steps of:

determining a plurality of resources that are required for performing a test by a test platform;

sending a resource request command to a manager, wherein the resource request command indicates a request for the resources;

determining in the manager whether each of the resources is available;

allocating all of the resources to the test platform if all of the resources are available;

allocating none of the resources to the test platform if one or more of the resources are unavailable, and sending a resource unavailable message to the test platform;

performing the test using the resources if all of the resources are allocated; and releasing the resources after performing the test.

12. The method of claim 11 wherein one of the resources is an operator services trunk which is to point to a target bridging switch, the target bridging switch being comprised in the plurality of switches.

13. The method of claim 12 wherein the step of allocating further comprises the step of:

logging on to a non-bridging switch from which the operator service trunk originates; and configuring the non-bridging switch to have the operator service trunk point to the target bridging switch.

14. The method of claim 11 wherein one of the resources comprises a connection from a test platform performing the test to a switch comprised in the plurality of resources.

15. The method of claim 14 wherein the step of allocating further comprises sending a connect command to a cross-connect, wherein the cross-connect dynamically connects the test platform to the switch in response to the connect command.

16. A computer program product comprising a computer usable medium having computer program logic embodied thereon for causing a computer to manage the allocation of a plurality of resources between a plurality of test platforms, the computer program logic comprising:

first computer program code means for causing the computer to receive a command from a first test platform requesting the plurality of resources;

second computer program code means for causing the computer to determine the availability of each of said resources in response to receiving said command;

third computer program code means for causing the computer to allocate all of said resources to said first test platform if all of said resources are available for allocation;

fourth computer program code means for causing the computer to allocate none of said resources to said first test platform if one or more of said resources are unavailable for allocation.

* * * * *